United States Patent
Foroughi et al.

(10) Patent No.: US 11,831,588 B2
(45) Date of Patent: Nov. 28, 2023

(54) TIME AWARE SELF-ATTENTIVE MODELS FOR PERSONALIZED CONVERSATIONAL MESSAGES

(71) Applicant: Intuit Inc., Mountain View, CA (US)

(72) Inventors: Homa Foroughi, Alberta (CA); Chang Liu, Alberta (CA); Pankaj Gupta, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/111,487

(22) Filed: Dec. 3, 2020

(65) Prior Publication Data

US 2022/0182342 A1     Jun. 9, 2022

(51) Int. Cl.
*H04L 51/02* (2022.01)
*G06F 40/56* (2020.01)
*H04L 51/234* (2022.01)
*G06N 3/045* (2023.01)

(52) U.S. Cl.
CPC .............. *H04L 51/02* (2013.01); *G06F 40/56* (2020.01); *G06N 3/045* (2023.01); *H04L 51/234* (2022.05)

(58) Field of Classification Search
None
See application file for complete search history.

(56) References Cited

U.S. PATENT DOCUMENTS

| | | | |
|---|---|---|---|
| 2018/0173714 A1* | 6/2018 | Moussa | G06F 16/958 |
| 2020/0118145 A1* | 4/2020 | Jain | G06Q 30/01 |
| 2022/0138425 A1* | 5/2022 | Dernoncourt | G06N 3/044 |
| | | | 704/9 |

OTHER PUBLICATIONS

Hochreiter et al., "Long Short-Term Memory," Neural Computation 9(8), pp. 1735-1780 (Year: 1997).
Kim, "Convolutional Neural Networks for Sentence Classification," New York University, arXiv preprint arXiv:1408.5882, 6-pages (Year: 2014).
Lin et al., "A Structured Self-Attentive Sentence Embedding," Published as a Conference Paper at ICLR 2017, pp. 1-15 (Year: 2017).
Vaswani et al., "Attention Is All You Need," 31st Conference on Neural Information Processing Systems (NIPS 2017), Long Beach, CA, 15-pages (Year: 2017).

* cited by examiner

*Primary Examiner* — Kevin S Mai
(74) *Attorney, Agent, or Firm* — Paradice & Li LLP

(57) ABSTRACT

Systems and methods for personalizing messages in a conversational chatbot are disclosed. An example method may include receiving clickstream event data corresponding to click events by users of an application, generating featurized clickstream data based at least in part on the received clickstream event data, determining one or more predicted intentions for a first user based at least in part on the featurized clickstream data, and generating one or more personalized messages for the first user based at least in part on the one or more predicted user intentions.

19 Claims, 5 Drawing Sheets

TIME AWARE SELF-ATTENTIVE MODELS FOR PERSONALIZED CONVERSATIONAL MESSAGES

TECHNICAL FIELD

This disclosure relates generally to messaging in conversational chat systems, and more particularly to generating personalized messages for users of such chat systems.

DESCRIPTION OF RELATED ART

Conversational chat systems, or "chatbots," are increasingly deployed to assist user of various applications with a variety of tasks, such as answering frequently asked questions, assisting users with common tasks in the application, and so on. Allowing for chatbots to answer simple and commonly asked questions may allow for customer assistance to be provided in a more cost effective manner, allowing the use of fewer customer service representatives for answering customer questions. After all, questions answered by a chatbot need not be escalated to a customer service representative.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for personalizing messages in a conversational chatbot. An example method includes receiving clickstream event data corresponding to click events by users of an application, generating featurized clickstream data based at least in part on the received clickstream event data, determining one or more predicted intentions for a first user based at least in part on the featurized clickstream data, and generating one or more personalized messages for the first user based at least in part on the one or more predicted user intentions.

In some aspects, generating the featurized clickstream data may include filtering out irrelevant clickstream events from the clickstream event data, such as clickstream events for unrelated applications. In some aspects, generating the featurized clickstream data may also include partitioning the clickstream event data into one or more time-based windows. In some aspects, the time-based windows may be overlapping windows corresponding to click events received within a threshold time interval. In some aspects, generating the featurized clickstream data may also include extracting relevant information from click events in the clickstream data, the relevant information including at least a user identifier and an event type. In some aspects, generating the featurized clickstream data may also include aggregating events chronologically by user. In some aspects, generating the featurized clickstream data may also include serializing the aggregated events for transmission.

In some aspects, the one or more predicted intentions for the first user determined are determined using a time-aware self-attentive long short-term memory (LSTM) model.

In some aspects, determining the one or more predicted intentions for the first user includes receiving the featurized clickstream data at an LSTM layer, generating one or more outputs of the LSTM layer based on the featurized clickstream data, determining, using a self-attention layer, one or more intents based at least in part on the generated one or more outputs of the LSTM layer, adjusting a time-based relevance of the one or more intents based at least in part on a current time period, and determining the one or more predicted intentions for the first used based at least in part on the one or more intents and on the adjusted time-based relevance of the one or more intents. In some aspects, the LSTM layer includes a plurality of LSTM modules, each LSTM module outputting a corresponding output of the LSTM layer. In some aspects, determining the one or more intents using the self-attention layer includes determining the one or more intents based at least in part on applying corresponding weights to one or more outputs of the LSTM layer. In some aspects, adjusting the time-based relevant of the one or more intents is based at least in part on one or more most frequently observed intents during the current time period.

In some aspects, the one or more personalized messaged generated for the first user include one or more welcome messages for the first user. In some aspects, the one or more welcome messages correspond to one or more actions the first user may take using the application, each action corresponding to one or more of the predicted intentions.

Another innovative aspect of the subject matter described in this disclosure can be implemented in a system for generating personalized messages using a time-aware self-attentive long short-term memory (LSTM) model. An example system may include one or more processors and a memory storing instructions for execution by the one or more processors. Execution of the instructions causes the system to perform operations including receiving clickstream event data corresponding to click events by users of an application, generating featurized clickstream data based at least in part on the received clickstream event data, determining one or more predicted intentions for a first user based at least in part on the featurized clickstream data, and generating one or more personalized messages for the first user based at least in part on the one or more predicted user intentions.

In some aspects, generating the featurized clickstream data may include filtering out irrelevant clickstream events from the clickstream event data, such as clickstream events for unrelated applications. In some aspects, generating the featurized clickstream data may also include partitioning the clickstream event data into one or more time-based windows. In some aspects, the time-based windows may be overlapping windows corresponding to click events received within a threshold time interval. In some aspects, generating the featurized clickstream data may also include extracting relevant information from click events in the clickstream data, the relevant information including at least a user identifier and an event type. In some aspects, generating the featurized clickstream data may also include aggregating events chronologically by user. In some aspects, generating the featurized clickstream data may also include serializing the aggregated events for transmission.

In some aspects, the one or more predicted intentions for the first user determined are determined using a time-aware self-attentive long short-term memory (LSTM) model.

In some aspects, determining the one or more predicted intentions for the first user includes receiving the featurized clickstream data at an LSTM layer, generating one or more outputs of the LSTM layer based on the featurized clickstream data, determining, using a self-attention layer, one or more intents based at least in part on the generated one or more outputs of the LSTM layer, adjusting a time-based relevance of the one or more intents based at least in part on a current time period, and determining the one or more predicted intentions for the first used based at least in part on the one or more intents and on the adjusted time-based relevance of the one or more intents. In some aspects, the LSTM layer includes a plurality of LSTM modules, each LSTM module outputting a corresponding output of the LSTM layer. In some aspects, determining the one or more intents using the self-attention layer includes determining the one or more intents based at least in part on applying corresponding weights to one or more outputs of the LSTM layer. In some aspects, adjusting the time-based relevant of the one or more intents is based at least in part on one or more most frequently observed intents during the current time period.

In some aspects, the one or more personalized messaged generated for the first user include one or more welcome messages for the first user. In some aspects, the one or more welcome messages correspond to one or more actions the first user may take using the application, each action corresponding to one or more of the predicted intentions.

Another innovative aspect of the subject matter described in this disclosure can be implemented in a system for generating personalized messages using a time-aware self-attentive long short-term memory (LSTM) model. An example system may include one or more processors and a memory storing instructions for execution by the one or more processors. Execution of the instructions causes the system to perform operations including receiving clickstream event data corresponding to click events by users of an application, generating featurized clickstream data based at least in part on the received clickstream event data, determining one or more predicted intentions for a first user based at least in part on the featurized clickstream data, and generating one or more personalized messages for the first user based at least in part on the one or more predicted user intentions.

In some aspects, the one or more predicted intentions for the first user determined are determined using a time-aware self-attentive long short-term memory (LSTM) model. In some aspects, determining the one or more predicted intentions for the first user includes receiving the featurized clickstream data at an LSTM layer, generating one or more outputs of the LSTM layer based on the featurized clickstream data, determining, using a self-attention layer, one or more intents based at least in part on the generated one or more outputs of the LSTM layer, adjusting a time-based relevance of the one or more intents based at least in part on a current time period, and determining the one or more predicted intentions for the first used based at least in part on the one or more intents and on the adjusted time-based relevance of the one or more intents. In some aspects, the LSTM layer includes a plurality of LSTM modules, each LSTM module outputting a corresponding output of the LSTM layer. In some aspects, determining the one or more intents using the self-attention layer includes determining the one or more intents based at least in part on applying corresponding weights to one or more outputs of the LSTM layer. In some aspects, adjusting the time-based relevant of the one or more intents is based at least in part on one or more most frequently observed intents during the current time period.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
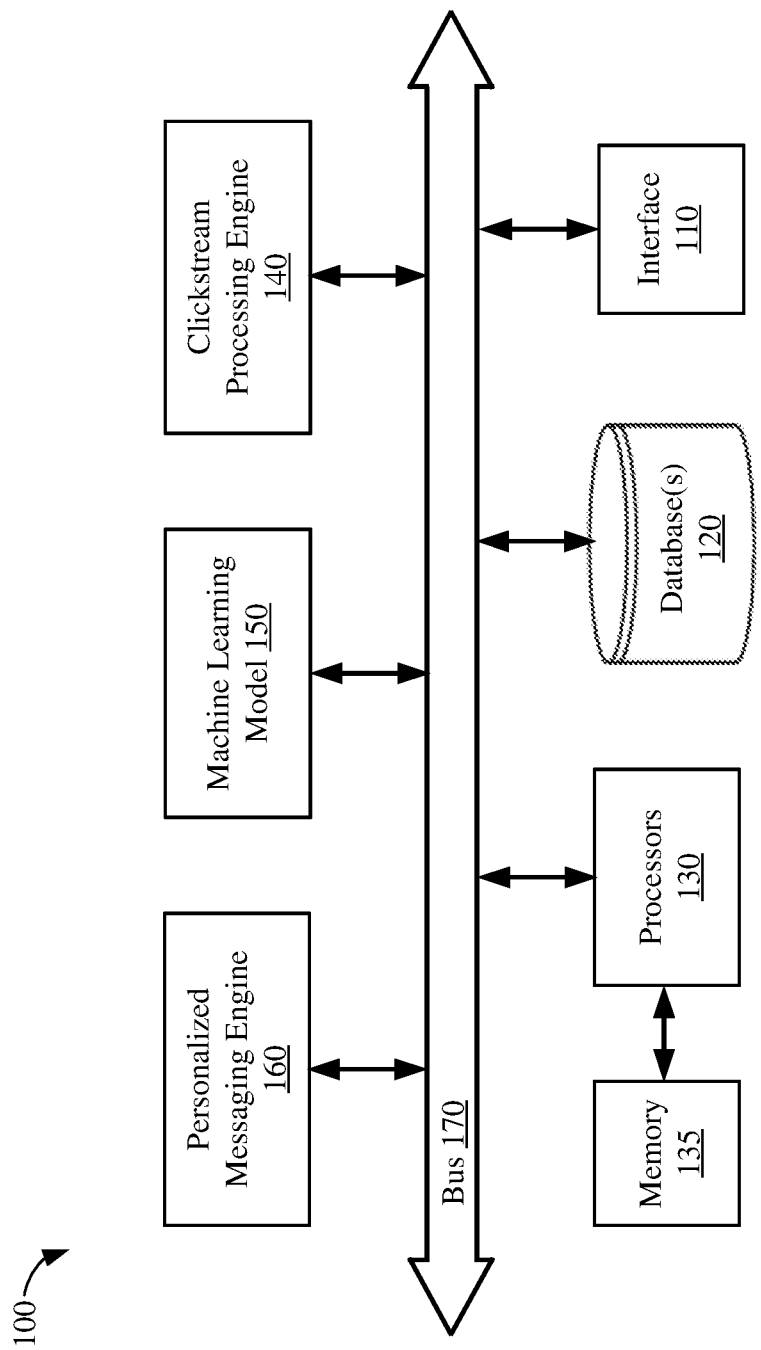
FIG. 1 shows an intent-based personalized messaging system, according to some implementations.

Implementations of the subject matter described in this disclosure may be used to infer user intentions based on clickstream data, self-attention mechanisms, and time-aware processing, and to generate personalized messages for user based on these inferred intentions. For example, various implementations disclosed herein may generate personalized messages in the form of customer support messages associated with a computing application, and the inferred intents of the user may be based on the user's interactions with the application, as reflected in the clickstream data. The intent inference may be based on a trained machine learning model, which may infer user intentions based on featurized clickstream data, for example using a long short-term memory (LSTM) architecture. The user intentions may be further based on a self-attention mechanism, which is trained to predict relative importance of click events with respect to the user intentions. Further, the machine learning model may be time-aware, and may, for example, alter the inferred user intentions based at least in part on a current time, or a freshness of the clickstream data. These, and other aspects of the example implementations are discussed further below.

Various implementations of the subject matter disclosed herein provide one or more technical solutions to the technical problem of providing personalized messaging in near real time to assist users of a computer application. Example implementations may featurize clickstream data and infer user intentions based on the featurized clickstream data using a trained machine learning model incorporating a self-attentive LSTM architecture. Further, some implementations may further be time-aware, allowing for the predicted user intentions to be based on a current time and/or on a freshness of the clickstream data. Allowing for the personalization of assistance messages in near real-time based on user intentions inferred using a self-aware LSTM model, may increase efficiency and accuracy of user support provided for such computing applications, by providing more relevant user assistance, both because the clickstream data is more recent, and because the inferred intentions may be more accurate, due to the use of the self-attentive aspects of the machine learning model. More specifically, various aspects of the present disclosure provide a unique computing solution to a unique computing problem that did not exist prior to electronic or online user assistance systems that can receive and process clickstream data, in order to determine user intentions with respect to a computing application. As such, implementations of the subject matter disclosed herein are not an abstract idea such as organizing human activity or a mental process that can be performed in the human mind.

Moreover, various aspects of the present disclosure effect an improvement in the technical field of providing personalized messaging in near real time to assist users of a computer application. The use of near real-time clickstream data, and the inference of user intentions using a self-attentive LSTM model may allow for more accurate and relevant prediction of user intents, allowing for more efficient use of computing resources, and for fewer user questions requiring escalation to a human customer service agent. Featurizing clickstream data, using a trained self-attentive LSTM model to predict user intentions, and generate personalized messages based on the predicted user intentions cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

FIG. 1 shows an intent-based personalized messaging system 100, according to some implementations. Various aspects of the intent-based personalized messaging system 100 disclosed herein may be applicable for predicting user intentions based on received clickstream data, and generating personalized messaging based on the predicted user intentions in a variety of applications. Such functionality may be useful for providing user assistance for a wide variety of applications, such as word processing applications, spreadsheet applications, financial account management applications, photograph manipulation or management applications, and so on. In some aspects, the intent-based personalized messaging system 100 may be configured to generate personalized messages for users of a single specified computing application, while in some other aspects, the intent-based personalized messaging system 100 may be configured to generate personalized messages for users of two or more computing applications.

The intent-based personalized messaging system 100 is shown to include an input/output (I/O) interface 110, a database 120, one or more data processors 130, a memory 135 coupled to the data processors 130, a clickstream processing engine 140, a machine learning model 150, and a personalized messaging engine 160. In some implementations, the various components of the intent-based personalized messaging system 100 may be interconnected by at least a data bus 170, as depicted in the example of FIG. 1. In other implementations, the various components of the intent-based personalized messaging system 100 may be interconnected using other suitable signal routing resources.

The interface 110 may include a screen, an input device, and other suitable elements that allow a user to provide information to the intent-based personalized messaging system 100 and/or to retrieve information from the intent-based personalized messaging system 100. Example information that can be provided to the intent-based personalized messaging system 100 may include configuration information for the intent-based personalized messaging system 100, such as information for configuring the clickstream processing engine, training data or a trained machine learning model for the machine learning model 150, messages corresponding to various user intents for the personalized messaging engine 160, or the like. Example information that can be retrieved from the intent-based personalized messaging system 100 may include featurized clickstream data, information about the accuracy of inferred user intentions, user feedback, configuration information for the intent-based personalized messaging system 100, and the like.

The database 120, which may represent any suitable number of databases, may store any suitable information pertaining to configuration of the intent-based personalized messaging system 100, to users of the intent-based personalized messaging system 100, and to personalized messages corresponding to inferred user intentions. For example, the information may include configuration information for generating featurized clickstream data using the clickstream processing engine 140, may include configuration information for the machine learning model 150, and may include a plurality of personalized messages corresponding to possible inferred intents for use by the personalized messaging engine 160. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the intent-based personalized messaging system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The clickstream processing engine 140 may receive clickstream data corresponding to user activity with respect to one or more applications. For example, the clickstream data may include a plurality of clicks, selections, accounts, and so on, for each user of a plurality of users. As discussed in more detail below, the clickstream processing engine 140 may generate featurized clickstream data based on the received clickstream data. Generating the featurized clickstream data may include filtering irrelevant activity, such as activity for one or more applications not associated with personalized messaging. Generating the featurized clickstream data may also include windowing the clickstream activity to include data from one or more recent time windows. Generating the featurized clickstream data may also include extracting relevant information from relevant clickstream events. Generating the featurized clickstream data may also include aggregating clickstream events by user. Generating the featurized clickstream data may also include serializing the aggregated clickstream.

The machine learning model 150 may include any number of machine learning models that can be used to infer user intentions based on the featurized clickstream data generated by the clickstream processing engine 140. A machine learning model can take the form of an extensible data structure that can be used to represent sets of words or phrases and/or can be used to represent sets of attributes or features. The machine learning models may be seeded with historical data indicating relationships between field values and values of dependent fields for one or more historical fields. In some implementations, the machine learning models 160 may include deep neural networks (DNNs), which may have any suitable architecture, such as a feedforward architecture or a recurrent architecture. For example, as discussed below, the machine learning model 150 may include one or more self-attentive LSTM machine learning models—a type of recurrent neural network—and may also include a time-aware feedforward stage for adjusting time-based relevance of inferred user intentions.

The personalized messaging engine 160 may be used to generate personalized messages for users of the intent-based personalized messaging system 100. As discussed further below, the personalized messaging engine 160 may receive the one or more inferred user intentions from the machine learning model 150 and generate one or more personalized messages corresponding to each of the inferred user intentions. These personalized messages may be presented to the user, for example in a user support session with a chatbot. In some aspects, the personalized messages may be personalized welcome messages, and may direct the user to one or more support items relating to the inferred user intentions. For example, when a user's inferred intention includes an intent to create a new account on the computing application, then the personalized message may indicate this, for example by including a message such as "Trouble creating a new account? Click here for help," and may direct the user to one or more support items relating to account creation.

The particular architecture of the intent-based personalized messaging system 100 shown in FIG. 1 is but one example of a variety of different architectures within which aspects of the present disclosure may be implemented. For example, in other implementations, the intent-based personalized messaging system 100 may not include the clickstream processing engine 140, the functions of which may be implemented by the processors 130 executing corresponding instructions or scripts stored in the memory 135. In some other implementations, the functions of the machine learning model 150 may be performed by the processors 130 executing corresponding instructions or scripts stored in the memory 135. Similarly, the functions of the personalized messaging engine 160 may be performed by the processors 130 executing corresponding instructions or scripts stored in the memory 135.

Figure 2:
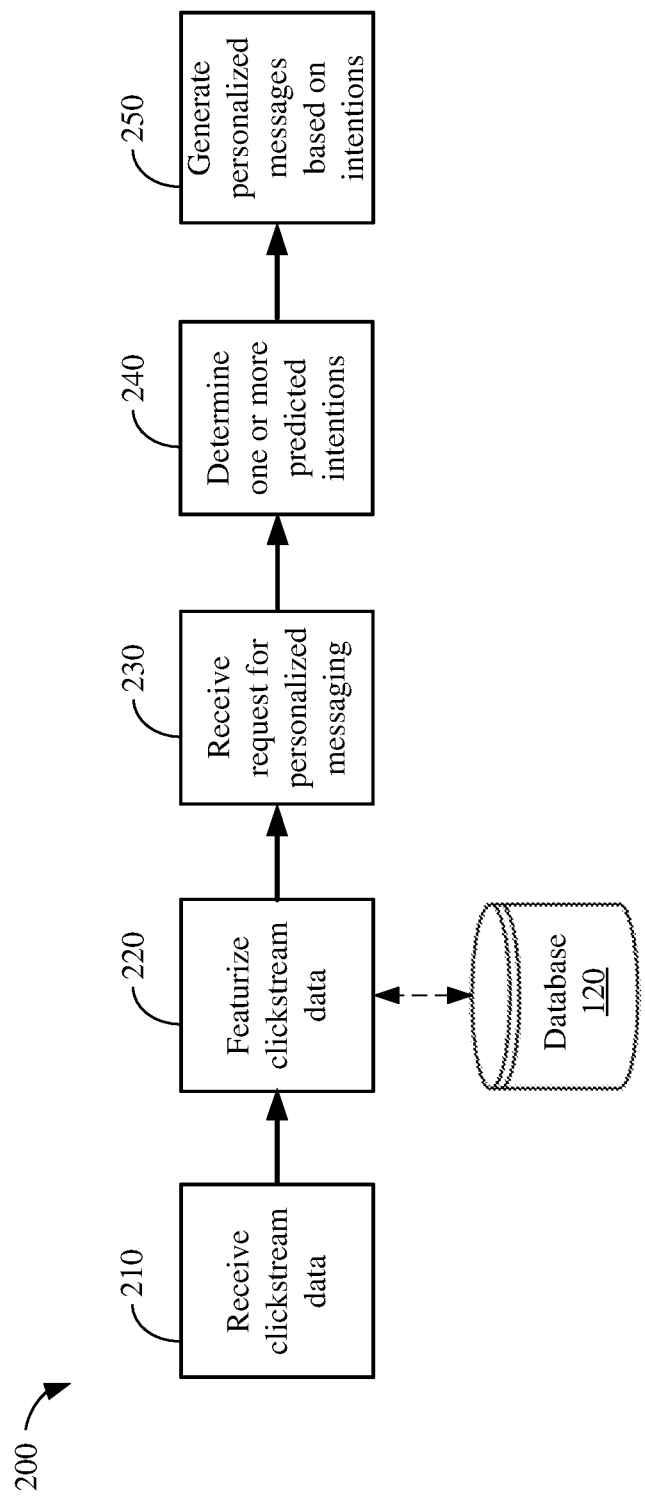
FIG. 2 shows a high-level overview of an example process flow that may be employed by the intent-based personalized messaging system of FIG. 1.

FIG. 2 shows a high-level overview of an example process flow 200 that may be employed by the intent-based personalized messaging system 100 of FIG. 1. In block 210, a clickstream data is received at the intent-based personalized messaging system 100. For example, the clickstream data may be received via one or more network interfaces coupled to the intent-based personalized messaging system 100. In block 220, the clickstream processing engine 140 generates featurized clickstream data based on the received clickstream data. For example, the clickstream processing engine 140 may featurize the received clickstream data according to one or more configuration files stored in the database 120. For example, the clickstream processing engine 140 may determine which information in the clickstream data is relevant based on such configuration files. In block 230, a request may be received for personalized messaging for a specified user. For example, such a request may automatically be generated when the user opens a help window or a chat assistance window. In block 240, the machine learning model 150 may determine one or more predicted intentions for the specified user. For example, as discussed below, the machine learning model 150 may include one or more self-attentive LSTM machine learning models and may include a time-aware feedforward stage for adjusting time-based relevance of inferred user intentions. At block 250, the personalized messaging engine 160 may generate personalized messages for the specified user based on the inferred user intentions. The personalized messages may then be provided to the specified user, for example by being displayed in the help window, chat assistance window, and so on.

As discussed above, conversational chat systems are increasingly deployed to assist user of various applications with a variety of tasks, such as answering frequently asked questions, assisting users with common tasks in the application, and so on. Providing users with relevant messaging may improve the efficiency and accuracy of user assistance provided by these systems. Conventional techniques may have latencies of over an hour in order to process users' clickstream data in order to infer user intentions. This may substantially impact the relevancy of personalized messaging based on such inferred intentions. Further, conventional techniques may not be able to infer user intentions based both on individual events in the user's clickstream data and to infer relative importance among a plurality of events in the user's clickstream data. Additionally, conventional techniques may be unable to account for seasonal and other time-based variations when inferring user intentions.

The example implementations allow for user clickstream data to be processed significantly more quickly as compared to conventional techniques. This may allow for inferred user intentions to be more relevant to the user's interactions with a computing application. Personalized messaging based on those recent interactions may be more relevant and helpful, as compared with the user's interactions an hour or more in the past. Further, the example implementations may infer user intentions using a time-aware self-attentive LSTM (TaSa-LSTM) machine learning model. The self-attentive LSTM features of the TaSa-LSTM machine learning model may allow for the inference of user intentions based both on individual events in the user's clickstream data and on inferred relative importance among a plurality of events in the user's clickstream data. Finally, the time-aware features of the TaSa-LSTM machine learning model may allow for inferences to account for seasonal variations in predicted user intentions, for time-based drift in the user's intentions, and for other time-based variations in user intentions.

In order to generate inferred intentions from user clickstream data, such clickstream data must first be processed in order to remove irrelevant information and format the clickstream data to be used by an example TaSa-LSTM machine learning model to infer user intentions. Table 1, below, shows a high level example of such processing, which may be called "featurizing" the clickstream data.

|  | W1 | W2 | W3 | W4 |
|---|---|---|---|---|
| User A | A1, A2, A3, A4 | A3, A4, A5 | A5, A6 | A6, A7, A8 |
| User B | B1, B2 | B2, B3 | B3, B4 | B4, B5 |
| User C | C1, C2 | C2, C3 | C3, C4, C5 | C4, C5, C6 |

TABLE 1

| Step | Input | Output |
|---|---|---|
| 1. Filtering | [{product: a . . .},<br>{product: b . . . },<br>{product: c . . . },<br>{product: c . . . },<br>Product: d . . . }] | [{product: c . . .},<br>{product: c . . .}] |
| 2. Windowing | (Refer to Table 2 and Figure 3) | |
| 3. Extraction | [{product: c, timestamp: 123,<br>customerID: 1, click: c2,<br>browser: Firefox, . . . }, . . . ] | [{customerID: 1, click: c2}, . . . ] |
| 4. Aggregation | [{customerID: 1, click: c2},<br>{customerID: 1, click: c4},<br>{customerID: 1, click: c5},<br>{customerID: 2, click: c2},<br>{customerID: 2, click: c1},<br>{customerID: 2, click: c3}, . . . ] | [{customerID: 1, clicks: c2, c4, c5},<br>{customerID: 2,<br>clicks: c2, c1, c3}, . . . ] |
| 5. Serialization | [{customerID: 1, clicks: c2, c4, c5},<br>{customerID: 2, clicks: c2, c1, c3}, . . . ] | [over-the-wire-byte-array] |

As shown above with respect to Table 1, featurizing the clickstream data may include 5 steps: filtering irrelevant events, windowing, or partitioning, the relevant events by time, extracting useful information from the relevant events, aggregating the relevant events by user, and serializing the aggregated events (e.g., for over the wire transmission).

Filtering may include removing events from the clickstream data relating to irrelevant events. Such irrelevant events may include events from one or more computing applications for which user intentions are not to be inferred. With respect to Table 1, the computing application of interest is product c, and so filtering the clickstream data includes removing clickstream data for products a, b, and d.

Figure 3:
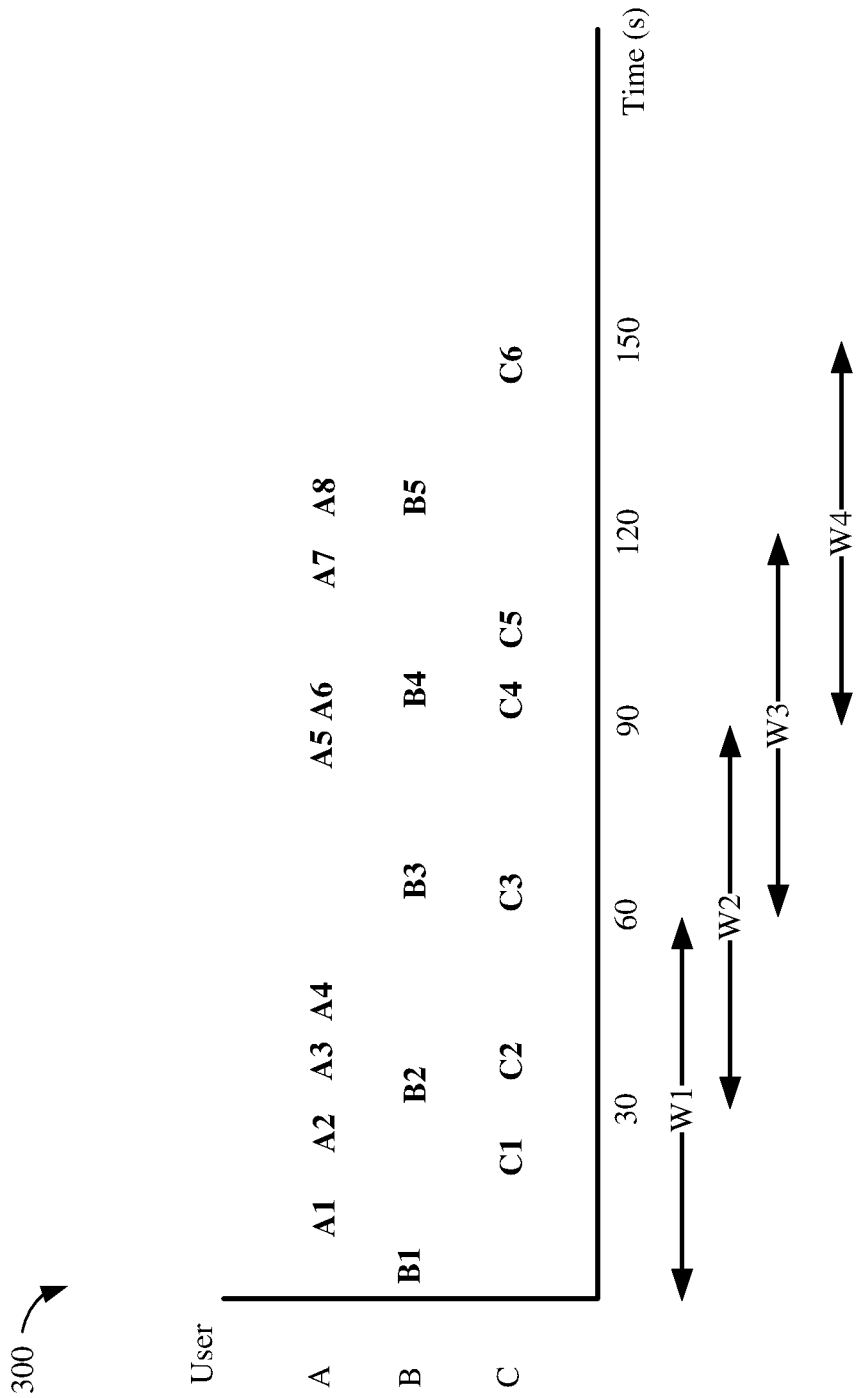
FIG. 3 shows an example timeline of clicks which may be windowed as a part of clickstream featurization, according to the example implementations.

Understanding user behavior may depend on the timing of click events. As such, each click event may include a timestamp. Accordingly, processing the clickstream data may include windowing the clickstream data into a plurality of time-based groups of click events. Each window may have a fixed duration and may be created and updated periodically. The windows may be overlapping. In some aspects, the windows may be sliding windows, and may be refreshed with recent click events without discarding information in previous windows. For example, FIG. 3 shows an example timeline 300 of clicks which may be windowed as a part of clickstream featurization, according to the example implementations. With respect to FIG. 3, click events from three users are shown, namely users A, B, and C, whose respective events are noted A1, A2, A3, . . . , B1, B2, B3, . . . , and C1, C2, C3, . . . . Each window may have a fixed duration, for example 60 seconds. Further, each window may be overlapping, for example each window may overlap 30 seconds with a previous window, and 30 seconds with a subsequent window. Thus, windowing the events shown in FIG. 3 may include placing each event in one or more of windows W1, W2, W3, and W4. More particularly, windowing the events shown in FIG. 3 may result in the click events for the users A, B, and C as shown below in FIG. 2.

After windowing the filtered clickstream data, relevant click event details may be extracted from the relevant events. For example, as shown in Table 1, the clickstream data for a relevant event may include information not relevant for inferring user intentions. For example, such event information may indicate the user's browser type, network connection details, and so on. Extracting the relevant details from each click event may include removing such information. For example, as shown in Table 1, information about user 1's browser type is removed from a relevant click event.

After filtering, windowing, and extracting, relevant click events may be aggregated by user. For example, as shown in Table 1, click events from user 1 are aggregated, and similarly with click events from user 2, and any other users 3, 4, 5, etc. Aggregating relevant click information by user may be useful because user intentions are inferred on a per user basis.

Finally, the aggregated clickstream data may be serialized into a byte array for transmission. For example, the serialized clickstream data may then be transmitted for storage, transmitted to an example TaSa-LSTM system for inferring user intentions, and so on.

Note that while the above describes featurization of click event data, clickstream data may also include other information, for example, search terms or other information entered into the computing application, selection information, information about which pages or other locations within the computing application users have visited and so on. Such information may be featurized similarly to the click event featurization described above. Also, while Table 1 shows 5 ordered steps performed for featurizing clickstream data, in some other implementations these five steps may be performed out of order, or one or more of the steps may be omitted.

Figure 4:
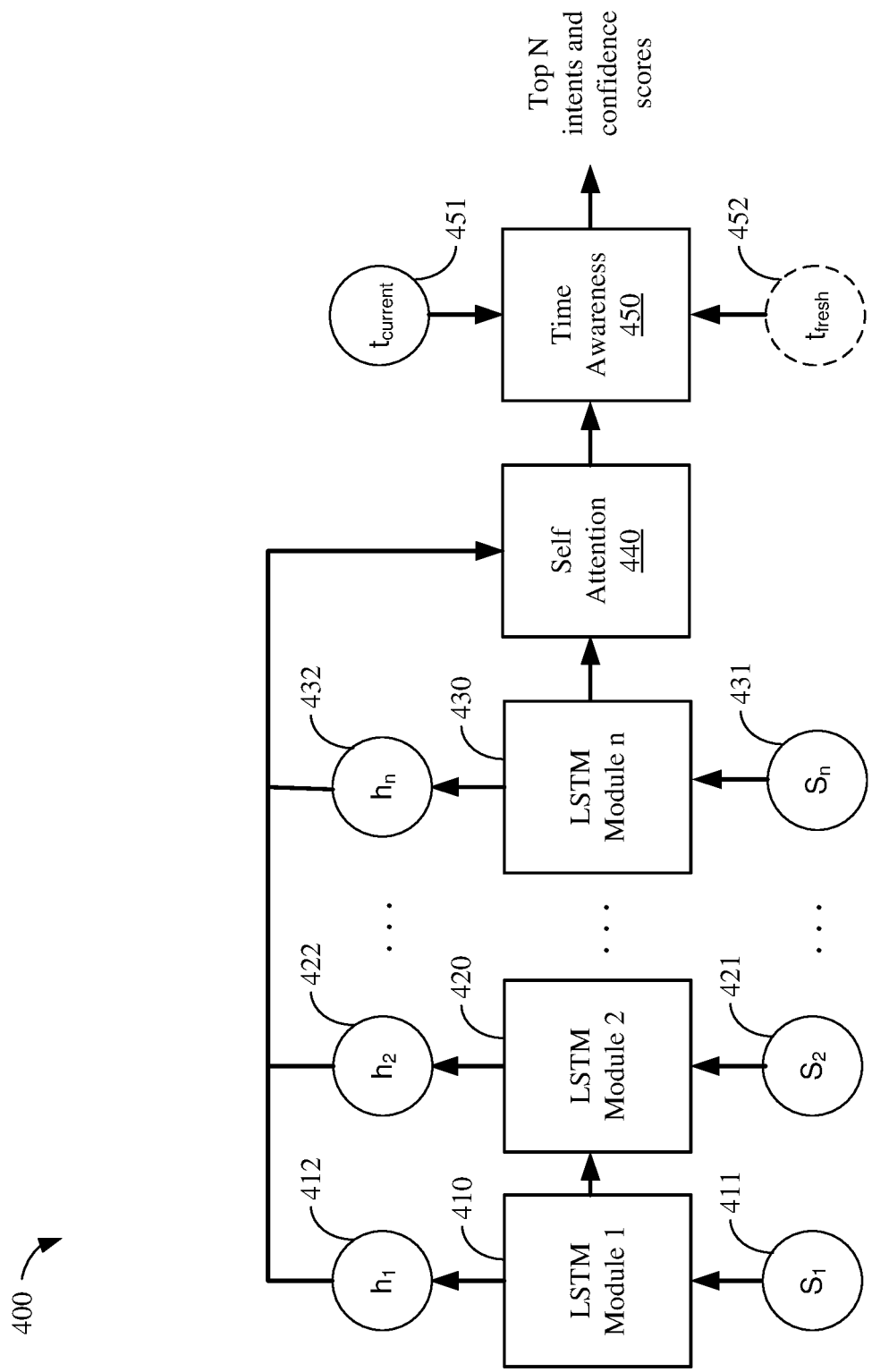
FIG. 4 shows an example time-aware self-attentive long short-term memory (LSTM) system, according to some of the example implementations.

FIG. 4 shows an example time-aware self-attentive LSTM system 400, according to some of the example implementations. For example, time-aware self-attentive LSTM system 400 may be an example of intent-based personalized messaging system 100 of FIG. 1 and may perform the process flow 200 of FIG. 2. The time-aware self-attentive LSTM system 400 is shown to include LSTM modules 410, 420, and 430, having respective inputs 411, 421, and 431, as well as respective outputs 412, 422, and 432. Note that while only three LSTM modules are shown in FIG. 4, that in general there may be other numbers of LSTM modules in the time-aware self-attentive LSTM system 400 greater than three. Thus, FIG. 4 shows the three LSTM modules as being a first LSTM module 410, a second LSTM module 420, and an n-th LSTM module 430, where n may be an integer other than three. The time-aware self-attentive LSTM system 400 is also shown to include a self-attention module 440, and a time awareness module 450, the time awareness module having a current time input 451 and optionally an intent freshness input 452. The time-aware self-attentive LSTM system 400 may output a list, table, vector, or similar indicating one or more inferred intentions and associated confidence scores. For example, FIG. 4 shows a top N such inferred intentions and confidence scores being output from time-aware self-attentive LSTM system 400.

Prior to use for inferring user intentions, the time-aware self-attentive LSTM system 400 may be trained using appropriate training data, in a supervised or unsupervised training process. For example, the training data may include a set of featurized clickstream data for historical interactions between users and the computing application.

The time-aware self-attentive LSTM system 400 may receive featurized clickstream data, for example as described above with respect to Tables 1-2 and FIG. 3. The time-aware self-attentive LSTM system 400 may also receive a user identifier, indicating the user for whom intentions are to be inferred. These inputs may be provided as the inputs 411, 421, and 431 to the respective LSTM modules 410, 420, and 430. In some aspects, each of the inputs 411, 421, and 431 may each receive the featurized clickstream data and the user identifier, while in some other aspects each input may receive differing portions of the featurized clickstream data and user identifier. For example, one or more of the inputs may receive the featurized clickstream data, and one or more other inputs may receive the user identifier. In some aspects, featurized clickstream data for differing event types may be provided to each input. For example, input 411 may receive sign-in event data, while input 421 may receive account addition event data, and input 431 may receive data relating to transactions.

The LSTM modules 410, 420, and 430 may have respective outputs 412, 422, and 432. These outputs are "hidden" outputs, that is, they are internal to and not visible outside the time-aware self-attentive LSTM system 400. These hidden outputs are noted $h_1, h_2, \ldots h_n$ to note that in general, the time-aware self-attentive LSTM system 400 may have any number n of LSTM modules. Together these outputs may be referred to as a hidden vector, or a hidden representation vector h. In other words the hidden representation vector h is the output of the LSTM stage of the time-aware self-attentive LSTM system 400. This output may indicate a first plurality of inferred intentions for the user identifier provided to the time-aware self-attentive LSTM system 400. However, this first plurality of inferred intentions may not account for relative importance of featurized click events. The self-attention module 440 may account for such relative importance of the click events. For example, the self-attention module 440 may be trained to assign differing weights to the hidden outputs $h_1, h_2, \ldots h_n$ of the hidden representation vector h. The self-attention module 440 may generate an "attention vector," based on the hidden representation vector, indicating a second plurality of inferred intentions.

The attention vector may be provided to the time awareness module 450, which may allow for the inferred user intentions to reflect one or more time based dependencies of user intentions. For example, the time awareness module 450 may receive a current time period 451. For example, the current time period may be a current hour, day, week, month, year, or similar. Some user intentions may be highly correlated with the beginning of a workday, week, month or similar. For example, for a computing application relating to financial record-keeping, tax filing, or similar, then the current month may be highly correlated with user intentions. For example, during April, user intentions for users in the United States of America may be more likely to be related to tax filing. For example, the current time input 451 may be a vector encoding the current month in such cases. The attention vector may therefore be adjusted based at least in part on this current time period. In addition, the time awareness module 450 may optionally adjust the attention vector based at least in part on a freshness of the featurized clickstream data. For example, the intent freshness input 452 may indicate when one or more of the intentions has recently been inferred for a particular user, for example when one or more of the intentions have been inferred within a threshold time period or within a threshold number of inferences. For example, if ten intentions are inferred for a user, and eight have recently been inferred for the user, in order to provide new personalized messages to the user, the two intentions which have not recently been inferred for the user may be moved towards the top of the list of inferred intentions. In some aspects, the time awareness module 450 may adjust an ordering or a ranking of the inferred intentions in the awareness vector in order to accentuate new inferred user intentions.

The time-aware self-attentive LSTM system 400 may then output a list of a top N intentions inferred for the user. The time-aware self-attentive LSTM system 400 may also output one or more confidence scores associated with these inferred intentions. In some aspects a confidence score may be provided for each inferred intention, while in some other aspects a single confidence score for the model's inferences may be provided. For example, such a single confidence score may be an average of the confidence scores associated with each of the top N inferred intentions.

After determining one or more inferred intentions for a user, for example determining a top N inferred intentions as in time-aware self-attentive LSTM system 400, one or more personalized messages may be generated for the user corresponding to each of the one or more inferred intentions. In some aspects, the personalized messages may be "welcoming messages" presented to a user when the user opens a user assistance or "help" window. For example, if the computing application is an expense tracking application, and the user's clickstream data indicates clicks and selections relating to expense reports for business trips and travel miles, then the time-aware self-attentive LSTM system 400 may generate inferences relating to adding a trip, showing travel miles, turning on tracking of travel miles, and showing expenses. For such an example, when the user opens a help window, they may be presented with welcoming messages such as "How do I add a trip," "Show my business miles," "Show my expenses," "How do I turn on mileage tracking," or similar. One or more personalized messages may be previously generated and provided for each intention which may be inferred by the time-aware self-attentive LSTM system 400.

Figure 5:
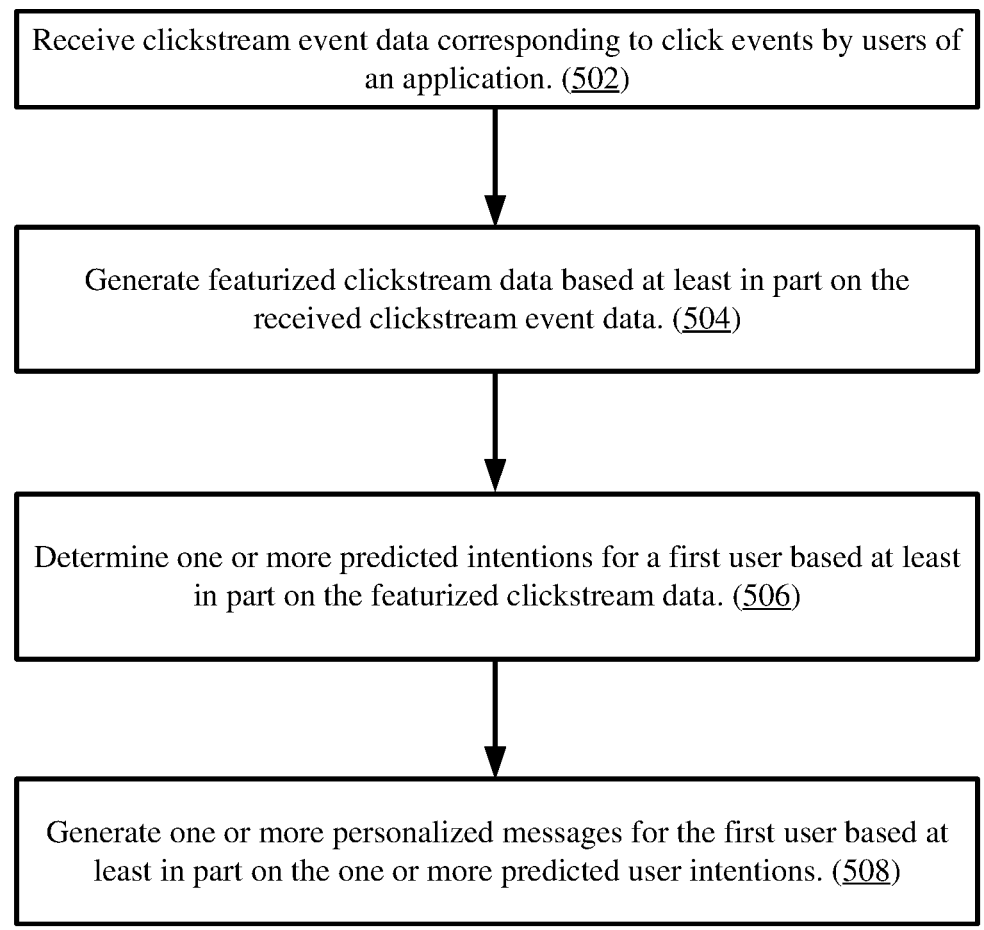
FIG. 5 shows an illustrative flow chart depicting an example operation for personalizing messages in a conversational chatbot, according to some implementations.

FIG. 5 shows an illustrative flow chart depicting an example operation 500 for personalizing messages in a conversational chatbot, according to some implementations. The example operation 500 may be performed by one or more processors of a computing device, such as using the intent-based personalized messaging system 100 of FIG. 1, or the time-aware self-attentive LSTM system 400. It is to be understood that the example operation 500 may be performed by any suitable systems, computers, or servers.

At block 502, the intent-based personalized messaging system 100 receives clickstream event data corresponding to click events by users of an application. At block 504, the intent-based personalized messaging system 100 generates featurized clickstream data based at least in part on the received clickstream event data. At block 506, the intent-based personalized messaging system 100 determines one or more predicted intentions for a first user based at least in part on the featurized clickstream data. At block 508, the intent-based personalized messaging system 100 generates one or more personalized messages for the first user based at least in part on the one or more predicted user intentions.

In some aspects, generating the featurized clickstream data in block 504 may include filtering out irrelevant clickstream events from the clickstream event data, such as clickstream events for unrelated applications. In some aspects, generating the featurized clickstream data in block 504 may also include partitioning the clickstream event data into one or more time-based windows. In some aspects, the time-based windows may be overlapping windows corresponding to click events received within a threshold time interval. In some aspects, generating the featurized clickstream data in block 504 may also include extracting relevant information from click events in the clickstream data, the relevant information including at least a user identifier and an event type. In some aspects, generating the featurized clickstream data in block 504 may also include aggregating events chronologically by user. In some aspects, generating the featurized clickstream data in block 504 may also include serializing the aggregated events for transmission.

In some aspects, the one or more predicted intentions for the first user determined in block 506 are determined using a time-aware self-attentive long short-term memory (LSTM) model.

In some aspects, determining the one or more predicted intentions for the first user in block 506 includes receiving the featurized clickstream data at an LSTM layer, generating one or more outputs of the LSTM layer based on the featurized clickstream data, determining, using a self-attention layer, one or more intents based at least in part on the generated one or more outputs of the LSTM layer, adjusting a time-based relevance of the one or more intents based at least in part on a current time period, and determining the one or more predicted intentions for the first used based at least in part on the one or more intents and on the adjusted time-based relevance of the one or more intents. In some aspects, the LSTM layer includes a plurality of LSTM modules, each LSTM module outputting a corresponding output of the LSTM layer. In some aspects, determining the one or more intents using the self-attention layer includes determining the one or more intents based at least in part on inferred relative importance among one or more intents indicated by the one or more outputs of the LSTM layer. In some aspects, adjusting the time-based relevant of the one or more intents is based at least in part on one or more most frequently observed intents during the current time period.

In some aspects, the one or more personalized messaged generated for the first user in block 508 include one or more welcome messages for the first user. In some aspects, the one or more welcome messages correspond to one or more actions the first user may take using the application, each action corresponding to one or more of the predicted intentions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of personalizing messages in a conversational chatbot, the method comprising:
   receiving clickstream event data corresponding to click events by users of an application;
   generating featurized clickstream data based at least in part on the received clickstream event data;
   determining one or more predicted intentions for a first user based at least in part on the featurized clickstream data using a time-aware self-attentive long short-term memory (LSTM) model by:
      receiving the featurized clickstream data at an LSTM layer;
      generating a plurality of hidden outputs of the LSTM layer based on the featurized clickstream data;
      receiving the plurality of hidden outputs at a self-attention layer;
      determining, using the self-attention layer, one or more intents based at least in part on the plurality of hidden outputs; and
      determining the one or more predicted intentions for the first user based at least in part on the one or more intents; and
   generating one or more personalized messages for the first user based at least in part on the one or more predicted user intentions.

2. The method of claim 1, wherein determining the one or more predicted intentions further comprises:
   adjusting a time-based relevance of the one or more intents based at least in part on a current time period; and
   determining the one or more predicted intentions for the first user based at least in part on the adjusted time-based relevance of the one or more intents.

3. The method of claim 1, wherein the LSTM layer comprises a plurality of LSTM modules, each LSTM module outputting a corresponding hidden output of the LSTM layer.

4. The method of claim 1, wherein determining the one or more intents using the self-attention layer comprises determining the one or more intents based at least in part on applying corresponding weights to hidden outputs of the plurality of hidden outputs of the LSTM layer.

5. The method of claim 1, wherein adjusting the time-based relevance of the one or more intents is based at least in part on one or more most frequently observed intents during the current time period.

6. The method of claim 1, wherein generating the featurized clickstream data comprises filtering out irrelevant click events from the clickstream event data.

7. The method of claim 1, wherein generating the featurized clickstream data comprises partitioning the clickstream event data into one or more time-based windows.

8. The method of claim 7, wherein the one or more time-based windows comprise one or more overlapping windows corresponding to click events received with a threshold time interval.

9. The method of claim 1, wherein generating the featurized clickstream data comprises extracting relevant information from click events in the clickstream event data, the relevant information including at least a user identifier and an event type.

10. The method of claim 1, wherein generating the featurized clickstream data comprises aggregating events chronologically by user.

11. The method of claim 10, wherein generating the featurized clickstream data comprises serializing the aggregated events for transmission.

12. The method of claim 1, wherein the one or more personalized messages for the first user comprise one or more welcome messages for the first user.

13. The method of claim 12, wherein the one or more welcome messages correspond to one or more actions the first user may take using the application, each action corresponding to one or more of the predicted intentions.

14. A system for generating personalized messages using a time aware self-attentive long short-term memory (LSTM) model, the system comprising:
   one or more processors; and
   a memory storing instructions that, when executed by the one or more processors, cause the system to perform operations comprising:
      receiving clickstream event data corresponding to click events by users of an application;
      generating featurized clickstream data based at least in part on the received clickstream event data;
      determining one or more predicted intentions for a first user based at least in part on the featurized clickstream data by:
         receiving the featurized clickstream data at an LSTM layer;
         generating a plurality of hidden outputs of the LSTM layer based on the featurized clickstream data;
         receiving the plurality of hidden outputs at a self-attention layer and determining, using the self-attention layer, one or more intents based at least in part on the plurality of hidden outputs; and
         determining the one or more predicted intentions for the first user based at least in part on the one or more intents; and
      generating one or more personalized messages for the first user based at least in part on the one or more predicted user intentions.

15. The system of claim 14, wherein execution of the instructions for determining the one or more predicted intentions causes the system to perform operations further comprising:
   adjusting a time-based relevance of the one or more intents based at least in part on a current time period; and determining the one or more predicted intentions for the first user based at least in part on the adjusted time-based relevance of the one or more intents.

16. The system of claim 14, wherein execution of the instructions for determining the one or more intents using the self-attention layer causes the system to perform operations further comprising determining the one or more intents based at least in part on applying corresponding weights to hidden output of the plurality of hidden outputs of the LSTM layer.

17. The system of claim 14, wherein the one or more personalized messages for the first user comprise one or more welcome messages for the first user.

18. The system of claim 17, wherein the one or more welcome messages correspond to one or more actions the first user may take using the application, each action corresponding to one or more of the predicted intentions.

19. A system for generating personalized messages using a time aware self-attentive long short-term memory (LSTM) model, the system comprising:
one or more processors; and
a memory storing instructions that, when executed by the one or more processors, cause the system to perform operations comprising:
receiving clickstream event data corresponding to click events by users of an application;
generating featurized clickstream data based at least in part on the received clickstream event data;
determining one or more predicted intentions for a first user based at least in part on the featurized clickstream data by:
receiving the featurized clickstream data at an LSTM layer;
generating a plurality of hidden outputs of the LSTM layer based on the featurized clickstream data;
receiving the plurality of hidden outputs at a self-attention layer and determining, using the self-attention layer, one or more intents based at least in part on the plurality of hidden outputs;
adjusting a time-based relevance of the one or more intents based at least in part on a current time period; and
determining the one or more predicted intentions for the first user based at least in part on the one or more intents and on the adjusted time-based relevance of the one or more intents; and
generating one or more personalized messages for the first user based at least in part on the one or more predicted user intentions.

* * * * *